United States Patent [19]

Hesse et al.

[11] 3,904,498

[45] Sept. 9, 1975

[54] PROCESS FOR THE REMOVAL OF CATALYST RESIDUES

[75] Inventors: Karl-Dieter Hesse; Karl-Ernst Koch, both of Marl, Germany

[73] Assignee: Chemische Werke Huls Aktiengesellschaft, Marl, Germany

[22] Filed: July 10, 1972

[21] Appl. No.: 270,005

[30] Foreign Application Priority Data
July 14, 1971 Germany............................ 2135124

[52] U.S. Cl...... 204/157.1 S; 208/13; 260/94.9 F; 260/680 B
[51] Int. Cl. ............................ B01j 1/00; B01j 1/12
[58] Field of Search.................. 252/412, 414, 420; 423/130, 127, 629; 260/683.74, 680 B, 669 P, 94.9 F, 94.7 R, 671 R, 671 C, 671 P, 666 B, 683.15 D; 208/13; 204/157.1 S

[56] References Cited
UNITED STATES PATENTS

| | | | |
|---|---|---|---|
| 2,413,310 | 12/1946 | Bloch.................................... | 208/13 |
| 2,734,892 | 2/1956 | Carter ............................ | 260/94.9 F |
| 3,070,589 | 12/1962 | Kirch et al...................... | 260/94.9 F |
| 3,090,777 | 5/1963 | Antonsen et al. .............. | 260/94.9 F |
| 3,114,742 | 12/1963 | Solvik et al..................... | 260/94.9 F |
| 3,231,514 | 1/1966 | Sechrist et al. ..................... | 252/412 |
| 3,499,054 | 3/1970 | Resh...................................... | 208/13 |
| 3,678,112 | 7/1972 | Wollensak .......................... | 423/127 |

FOREIGN PATENTS OR APPLICATIONS
1,058,676 2/1967 United Kingdom............ 260/94.9 F Primary Examiner—Winston A. Douglas
Assistant Examiner—P. E. Konopka
Attorney, Agent, or Firm—Millen, Raptes & White

[57] ABSTRACT

A process for removing residues of a catalyst comprising an aluminum compound of the formula $AlR_nX_{3-n}$, wherein R is alkyl, X is halogen, and $n$ is a whole or fractional number from 0 to 3 inclusive, from an organic solution containing said residue which comprises the steps of admixing an aqueous solution of an alkali or alkaline earth metal hydroxide with said organic solution to precipitate said catalyst residues as hydroxides or salts and separating precipitated catalyst residues from the resultant mixture, which is characterized by:

a. admixing the aqueous solution in an amount insufficient to form a second liquid phase in the resultant mixture, and forming a non-aqueous suspension of directly separable precipitated catalyst residues; and b. separating said precipitated catalyst residues in the solid phase directly from the resultant mixture.

3 Claims, No Drawings

PROCESS FOR THE REMOVAL OF CATALYST RESIDUES

BACKGROUND OF THE INVENTION

1. Field of the Invention

This invention relates to a process for the removal of catalyst residues from organic solutions of reaction products produced with the aid of catalysts which comprise aluminum halides and/or organoaluminum compounds, optionally together with a heavy metal compound soluble in organic solvents.

2. Description of the Prior Art

It is well-known that oligomers or polymers produced with the so-called Ziegler-Natta catalysts, and alkylation products prepared with certain Friedel-Crafts catalysts contain ash and are subject to discoloration, due largely to the presence of residues from the metallic components of the catalyst.

Due to the widespread use of these catalysts, many processes have been proposed for the elimination of these residues. Most of these processes are concerned with a treatment of the crude reaction product, generally dissolved in an organic solvent, with water or alcohols which optionally contain substances which dissolve or form complexes with the catalyst residues.

For example, German Unexamined Published Application No. 1,420,654 described one such technique to wash dissolved polymers in order to reduce the ash content with a scavanger medium, e.g., mineral acids, alkali hydroxides, alkali salts of organic acids, aliphatic alcohols, aliphatic ketones, aliphatic organic acids, esters of aliphatic alcohols and aliphatic organic acids, and water which can optionally contain a chelating agent. In accordance with this process, the scavenger medium is added to the polymer solution in such amounts that after the washing step it forms a second liquid phase containing the impurities. Subsequently, the scavenger medium phase is separated from the polymer solution phase, and the polymer is recovered therefrom. This method for the removal of catalyst residues is complicated and uneconomical, since considerable difficulties are encountered with respect to the separation, purification, and recycling of sizable quantities of liquid. Additionally, when using water or aqueous solutions of the aforementioned scavenger compounds, the waste water must be subjected to expensive purification procedures.

OBJECTS OF THE INVENTION

Accordingly, it is an object of this invention to provide a process for the removal of catalyst residues from organic solutions of reaction products.

Another object of this invention is to provide a process for removing catalyst residues from reaction products prepared with aluminum-containing catalysts.

A further object of this invention is to provide a process for removing catalyst residues from reaction products which minimizes the process steps required to separate such residues from the reaction product.

An additional object of this invention is to provide a process for purifying polymerization products from discoloring residues.

Other objects and advantages of this invention will become apparent to those skilled in the art upon further study of the specification and appended claims.

SUMMARY OF THE INVENTION

Briefly, the present invention provides a process for removing residues of a catalyst comprising an aluminum compound of the formula $AlR_nX_{3-n}$, wherein R is alkyl, X is halogen, and n is a whole or fractional number from 0 to 3 inclusive, from an organic solution containing said residue which comprises the steps of admixing an aqueous solution of an alkali or alkaline earth metal hydroxide with said organic solution to precipitate said catalyst residues as hydroxides or salts and separating precipitated catalyst residues from the resultant mixture, which is characterized by:

a. admixing the aqueous solution in an amount insufficient to form a second liquid phase in the resultant mixture, and forming a non-aqueous suspension of directly separable precipitated catalyst residues; and b. separating said precipitated catalyst residues in the solid phase directly from the resultant mixture.

DETAILED DISCUSSION

It has no been found that it is possible in a simple manner to remove catalyst residues from organic solutions of reaction products which have been prepared with the aid of catalysts which contain aluminum halides and/or organoaluminum compounds and optionally heavy metal compounds soluble in organic solvents, by a particular method for adding an alkaline agent. This is accomplished by adding to the organic solution containing catalyst residues an aqueous solution of an alkali or alkaline earth metal hydroxide in a minimal quantity of water such that no second liquid phase is formed, and thereafter separating the catalyst residues precipitated as hydroxides and salts.

The process of this invention can be advantageously employed to remove catalyst residues from organic solutions of substances produced with the aid of catalysts containing an aluminum compound of the formula $AlR_nX_{3-n}$, wherein R, X and n have the above-indicated values and wherein R is preferably lower alkyl, e.g., of 1 – 3 carbon atoms, especially methyl or ethyl, and X is preferably chlorine or bromine. Examples of such compounds include but are not limited to: $AlCl_3$; $AlBr_3$; $Al(C_2H_5)_3$; $Al(C_2H_5)Cl_2$; $Al(C_2H_5)Br_2$; $Al(C_2H_5)_2Cl$; $Al(C_2H_5)_2Br$; $Al(C_2H_5)_{1.5}Cl_{1.5}$; and $Al(C_2H_5)_{1.5}Br_{1.5}$; optionally together with compounds of the elements Fe, Co, Ni, Cr, Mo, W, Ti, Zr, and V which are soluble in organic solvents.

The organic solvent can be any of those solvents commonly employed with the organoaluminum catalysts. It will be appreciated that potentially greater amounts of catalyst residues can be removed by the process of this invention from polar organic solvents due to the greater solubility of the aqueous hydroxide solution therein, but many other organic solvents have a water solubility sufficiently high for the purposes of this invention. Preferred organic solvents include but are not limited to aromatic solvents, e.g., benzene, alkyl benzenes, alkanes, alkenes, cycloalkanes, cycloalkenes, e.g. cyclooctadiene or cyclodecatriene.

The amount of water added in the process of this invention in the form of an alkali or alkaline earth metal hydroxide solution and the concentration of the hydroxide in solution is just sufficient to ensure a rapid flocculation of the metallic components of the catalyst in the form of hydroxides. The amount of solution added is less than the quantity which is dissolved in the organic solvent under operating conditions of the process and which is absorbed by the thus-precipitated hydroxides. One skilled in the art can readily determine the optimum amount of water in any individual case simply by testing aliquots.

The amount of alkali or alkaline earth metal hydroxide added to the water to form an aqueous hydroxide solution for use in the process of this invention must be determined in each instance, since it is dependent on the type of the catalyst and on the type and quantity of the components present therein. It will be apparent, for example, that in order to remove residues of a catalyst such as $Al(C_2H_5)Cl_2$, a larger amount of alkali is required than for the stoichiometric removal of residues of a catalyst such as $Al(C_2H_5)_2Cl$.

The hydroxide content of the aqueous solution can be up to the saturation point or even slightly supersaturated; generally, this concentration ranges from 100 to 600 mg/ml, preferably from 250 to 500 mg/ml, e.g., in the cases of sodium hydroxide and potassium hydroxide.

In the process of this invention, aqueous solutions of sodium hydroxide or potassium hydroxide are preferably employed. Preferably, in order to assure adequate admixture of the aqueous alkali solution with the organic reaction solution containing catalyst residues, the volume of aqueous solution added will approximate the amount thereof which is soluble in the organic reaction solution.

If the catalyst residue to be removed in accordance with the process of this invention contain heavy metal components in a reduced oxidation stage, these components are not readily susceptible to precipitation. In such cases, it is advantageous to add a heavy metal oxidation agent to the aqueous alkali or alkaline earth metal hydroxide solution. Suitable oxidizing agents include but are not limited to organic and inorganic peroxides and oxidizing metallic salts; hydrogen peroxide is preferred.

The aqueous solution of the alkali or alkaline earth metal hydroxide, optionally containing an oxidizing agent, is preferably admixed rapidly into the organic solution to be freed of catalyst residues. Especially suitable devices for conducting the process of this invention are high power agitators for either discontinuous or continuous operation, such as "Turrax" or "Supraton" ultrasonic devices. The precipitation is preferably conducted at temperatures of 20°–70°C.

The flocculated metallic hydroxides, optionally mixed with alkali or alkaline earth metal salts, the anions of which stem from inorganic or organic acid residues of the catalyst components, can be separated from the organic solution either immediately or after a short aging period. The separating step can be effected by sedimentation, but is advantageously conducted with the aid of a centrifuge or a decanter. The aging period preferably lasts from 0.1 to 5 hours, and its purpose is to coagulate the hydroxides.

The deslurried solution is generally water-clear and contains only minor proportions of inorganic ash components. Thereafter, the organic solvent is removed in a conventional manner, e.g., by distillation, and the reaction product is recovered in an ash-depleted condition. If the reaction product is not a polymer, further distillative purification can follow. The organic solvent can be recycled to the manufacturing process after removing the water still dissolved therein, e.g., with a molecular sieve.

The separated slurry which still contains remainders of the organic solvent can be burned, either immediately or after separating the solvent. The thus-obtained ash, depending on the particular metals contained therein, can either be used for the recovery of the metals and/or the salts thereof, or it can be discarded.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLES 1–7

The reaction solutions set forth in Table 1 are mixed with the quantities of NaOH or KOH, water, and hydrogen peroxide indicated in the table within 2 minutes in an "Ultra-Turrax" device. Thereafter, the solution is centrifuged discontinuously, and then the solvent is separated from the product by distillation.

TABLE 1

| Example | Solution | Catalyst (g./kg. of Solution) | | | Precip. Temp. °C. | Precipitation Components (g./l. of Solution) | | | Final Product | |
|---|---|---|---|---|---|---|---|---|---|---|
| | | | | | | Hydroxide | $H_2O$ total | $H_2O_2$ 10% | Ash Content (%) | Acid No. |
| 1 | Liquid PB* with 750 cp./20° C. 50% in benzene | 4.5 | Ethyl-Al sesquichbride | 1.7 Ni octoate | 30 | 2.25 NaOH | 4 | 0.5 | 0.007 | 0.07 |
| 2 | " | 4.5 | " | 1.7 " | 70 | 2.25 " | 4 | 0.5 | 0.015 | 0.17 |
| 3 | Liquid PB with 3000 cp./20° C. 50% in benzene | 2.5 | " | 0.3 " | 30 | 1.15 " | 4 | 0.1 | 0.02 | 0.06 |
| 4 | " | 2.5 | " | 0.3 " | 30 | 0.8 KOH | 1 | 0.5 | 0.017 | 0.18 |
| 5 | Cyclododecatriene 50% in benzene | 6.5 | " | 0.3 $TiCl_4$ | 30 | 3.5 NaOH | 4.2 | 0.4 | 0.005 | |
| 6 | 1,5-Cyclooctadiene | 8.0 | $Al(C_2H_5)_3$ | 4.0 Ni octo- | 30 | 6.25 " | 10.0 | 3.0 | | |
| 7 | sec.-Butylbenzene 20% in benzene | 25.0 | $AlCl_3$ | | 30 | 30.0 " | 30.0 | — | | |

*PB = solution-type polybutadiene.

EXAMPLES 8–10

The active liquid polybutadiene solution (catalyst content: 0.45% ethylaluminum sesquichloride/0.17% nickel octoate per kg. of solution) is intensively mixed, at the rate set forth in Table 2, in a "Supraton" mixer with 2.25 kg. of NaOH (dissolved in 3.55 kg. of water) and 0.5 kg. of 10% strength $H_2O_2$ per m³ of solution, and thereafter clarified in a continuous centrifuge. Subsequently, the solvent is removed from the polymer by distillation.

TABLE 2

| Example | Polymer Solution (m³/h.) | Ash Content of Final Product |
|---------|--------------------------|------------------------------|
| 8       | 1                        | 0.02 %                       |
| 9       | 5                        | 0.01 %                       |
| 10      | 10                       | 0.014%                       |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for removing residues of a catalyst consisting essentially of (i) an aluminum compound of the formula $AlR_nX_{3-n}$ wherein R is alkyl, X is halogen and n is a whole or fractional number from 0 to 3 inclusive and (ii) an organic solvent-soluble compound of a heavy metal selected from the group consisting of Fe, Co, Ni, Cr, Mo, W, Ti, Zr and V, which process comprises:

a. ultrasonically admixing an organic solution of reaction products from a Ziegler-Natta solution polymerization of an olefin containing said residues at a temperature of 20°–70° C. with a two-component aqueous solution consisting essentially of (i) NaOH or KOH in a hydroxide concentration of about 100–600 mg./ml. in a total amount sufficient to ensure rapid flocculation of said catalyst residues and (ii) $H_2O_2$ in an amount sufficient to oxidize said compound of a heavy metal, said components being in an amount of water less than the quantity thereof which is dissolved in the organic solvent and absorbed by the thus-precipitated catalyst resides under operating conditions of the process such that no second liquid phase is formed in the resultant mixture, which mixture consists essentially of a single liquid phase, non-aqueous suspension of directly separable precipitated catalyst residues as hydroxides and salts; and b. separating said precipitated catalyst resides in the solid phase directly from the resultant mixture.

2. A process according to claim 1, further comprising aging the resultant admixture to coagulate flocculated metal hydroxides.

3. A process according to claim 2, wherein said catalyst residues are separated by centrifugation or decantation.

* * * * *